(12) United States Patent
Hogue et al.

(10) Patent No.: US 11,293,468 B2
(45) Date of Patent: Apr. 5, 2022

(54) UNIVERSAL CASTINGS FOR RECTANGULAR TUBE CORNER STRESS RELIEF

(71) Applicant: DEERE & COMPANY, Moline, IL (US)

(72) Inventors: Jeffrey W. Hogue, Geneseo, IL (US); John R. Geyer, Silvis, IL (US)

(73) Assignee: DEERE & COMPANY, Moline, IL (US)

( * ) Notice: Subject to any disclaimer, the term of this patent is extended or adjusted under 35 U.S.C. 154(b) by 478 days.

(21) Appl. No.: 16/374,990

(22) Filed: Apr. 4, 2019

(65) Prior Publication Data
US 2020/0318310 A1    Oct. 8, 2020

(51) Int. Cl.
*F16B 9/00*    (2006.01)

(52) U.S. Cl.
CPC ..................................... *F16B 9/05* (2018.08)

(58) Field of Classification Search
CPC .. E04F 11/1812; E04F 11/1814; E04H 17/22; F16B 9/01; F16B 9/05; F16B 9/052; F16B 9/054; F16B 9/056; F16B 9/058; Y10T 403/3906; Y10T 403/47; Y10T 403/471; Y10T 403/472; Y10T 403/7096; Y10T 403/73
USPC ................ 403/188, 265, 266, 267, 382, 403
See application file for complete search history.

(56) References Cited

U.S. PATENT DOCUMENTS

| | | | |
|---|---|---|---|
| 4,232,881 A | | 11/1980 | Kolbel et al. |
| 5,979,130 A | * | 11/1999 | Gregg ..................... F16B 9/058 52/295 |
| 6,736,355 B2 | * | 5/2004 | Palfenier ................. F16B 9/056 248/70 |
| 7,942,385 B2 | * | 5/2011 | Begin .................. E04F 11/1812 256/65.14 |
| 2013/0214228 A1 | | 8/2013 | Sneith | |

FOREIGN PATENT DOCUMENTS

| | | | |
|---|---|---|---|
| CN | 205128847 U | 4/2016 | |
| DE | 2744523 A1 | 4/1978 | |
| DE | 3536901 A1 | * 4/1987 | .......... E04F 11/1812 |
| KR | 200332577 Y1 | 11/2003 | |

OTHER PUBLICATIONS

European Search Report issued in counterpart application No. 20164958.9 dated Jul. 13, 2020 (06 pages).

\* cited by examiner

*Primary Examiner* — Josh Skroupa (57) ABSTRACT

A gusset structure includes a body having a plate contacting end forming a plate mating surface, and extending from the plate contacting end to a distal end. The body defines a tube mating surface extending between the plate contacting end and the distal end. The plate mating surface engages a plate. The tube mating surface includes a first surface portion and a second surface portion forming an interior surface angle therebetween. The interior surface angle has a vertex disposed on a vertex axis, which intersects the plate mating surface. The first surface portion engages a first side wall of an elongate member. The second surface portion engages a second side wall of the elongate member. The body flares outward from the distal end toward the plate contacting end to distribute stress in the plate from the corner of the elongate member over a larger area.

18 Claims, 7 Drawing Sheets

UNIVERSAL CASTINGS FOR RECTANGULAR TUBE CORNER STRESS RELIEF

FIELD OF DISCLOSURE

The present disclosure generally relates to a gusset structure for distributing stress at a joint between a plate and an elongate member, and a structural assembly including the gusset structure.

BACKGROUND OF THE DISCLOSURE

A structural assembly may include an elongate member that is attached to a plate. Often, the elongate member is a tubular structure defining a hollow center. The elongate member is attached to the plate around a circumference of the elongate member, either at a terminal end of the elongate member, or at a midsection where the elongate member passes through the plate. The elongate member may include, for example, four side walls interconnected by four respective corners. Due to the high stiffness of the elongate member in the corner regions of the elongate member, High stress regions are formed in the plate where the plate is attached to the corners of the elongate member.

SUMMARY OF THE DISCLOSURE

According to an aspect of the present disclosure, a gusset structure is provided. The gusset structure is operable to distribute stress at a joint formed between a plate and an elongate member, over a larger area to thereby reduce the level of stress in the plate. The gusset structure includes a body having a plate contacting end forming a plate mating surface and a tube mating surface. The plate mating surface is configured for engaging the plate. The tube mating surface includes a first surface portion and a second surface portion forming an interior surface angle therebetween. The first surface portion and the second surface portion extend away from the plate contacting end. The interior surface angle has a vertex disposed on a vertex axis, which intersects the plate mating surface. The first surface portion of the tube mating surface is configured for engaging a first side wall of the elongate member. The second surface portion of the tube mating surface is configured for engaging a second side wall of the elongate member.

In one aspect of the gusset structure, the body includes a distal end spaced from the plate contacting end a length along the vertex axis. The tube mating surface extends between and interconnects the plate contacting end and the distal end of the body.

In one exemplary embodiment of the gusset structure, the plate mating surface is substantially perpendicular to the vertex axis. In other embodiments, the vertex axis may be slightly angled relative to the plate mating surface.

In one aspect of the gusset structure, the plate mating surface defines a first area, and the distal end forms an end surface defining a second area. The first area of the plate mating surface is larger than the second area of the end surface, such that the plate mating surface spreads the stress in the plate over a larger area.

In one aspect of the gusset structure, the body includes a cross-sectional area perpendicular to the vertex axis. The cross-sectional area of the body increases in size with movement along the vertex axis, with movement in a direction from the distal end toward the plate contacting end. In one embodiment, the cross-sectional area of the body changes at a variable rate-of-change per unit length along the vertex axis. In another embodiment, the cross-sectional area of the body changes at a constant rate-of-change per unit length along the vertex axis.

In one aspect of the gusset structure, the first surface portion of the tube mating surface defines a first outer edge at an intersection of the first surface portion and an exterior surface of the body. The body defines a first distance measured between the vertex axis and the first outer edge, at the distal end of the body. The body defines a second distance measured between the vertex axis and the first outer edge, at the plate contacting end. The first distance is less than the second distance. In another aspect of the gusset structure the second surface portion of the tube mating surface defines a second outer edge at an intersection of the second surface portion and the exterior surface of the body. The body defines a third distance between the vertex axis and the second outer edge at the distal end of the body. The body defines a fourth distance between the vertex axis and the second outer edge at the plate contacting end. The third distance is less than the fourth distance. In one exemplary embodiment, the first distance and the third distance are substantially equal, and the second distance and the fourth distance are substantially equal. As such, the plate contacting end is larger than the distal end so that stresses in the plate are spread out over a larger area.

In one aspect of the gusset structure, the plate mating surface forms a partial rounded shape. In one exemplary embodiment, the partial rounded shape is a partial elliptical shape. In another exemplary embodiment, the partial rounded shape is a partial circular shape.

In another aspect of the gusset structure, the tube mating surface includes a third surface portion interconnecting the first surface portion and the second surface portion. The third surface portion includes a cross-sectional shape perpendicular to the vertex axis that forms an arcuate shape. The arcuate cross-sectional shape of the third surface portion is sized to mate with a rounded corner of the elongate member interconnecting the first side wall and the second side wall of the elongate member, such that the rounded corner of the elongate member nests within an angular pocket formed by the tube mating surface.

In one embodiment of the gusset structure, the body is magnetized, so that a magnetic force may temporarily hold the body in place relative to the elongate member and/or the plate prior to the body being permanently affixed to the elongate member and the plate, such as by welding.

In another embodiment of the gusset structure, the body may include a removeable handle that extends outwardly from the body. The handle may be used as a hand hold, buy an assembly person or a machine, to hold the body in place relative to the elongate member and/or the plate while the body is being permanently affixed thereto, such as by welding.

According to another aspect of the present disclosure, a structural assembly is provided. The structural assembly includes a plate, and an elongate member attached to the plate. The elongate member extends along a central longitudinal axis, and includes a first side wall and a second side wall arranged adjacent to each other and positioned to form an interior wall angle therebetween. The plate is positioned transverse to the central longitudinal axis of the elongate member. A gusset structure is attached to both the plate and the elongate member. The gusset structure includes a body having a plate contacting end forming a plate mating surface disposed in abutting engagement with the plate. The body forms a tube mating surface having a first surface portion and a second surface portion. The first surface portion and the second surface portion form an interior surface angle therebetween, which is substantially equal to the interior wall angle. The first surface portion and the second surface portion both extend away from the plate contacting end to a distal end of the body. The interior surface angle has a vertex disposed on a vertex axis, which intersects the plate mating surface. In one exemplary embodiment, the vertex axis is parallel with the central longitudinal axis of the elongate member. The first surface portion of the tube mating surface is disposed against the first side wall of the elongate member, and the second surface portion of the tube mating surface is disposed against the second side wall of the elongate member. The distal end of the body is spaced from the plate contacting end a length along the vertex axis, with the tube mating surface extending between and interconnecting the plate contacting end and the distal end of the body. The plate mating surface defines a first area, and the distal end forms an end surface defining a second area. The first area of the plate mating surface is larger than the second area of the end surface.

In one embodiment of the structural assembly, the body of the gusset structure includes a cross-sectional area perpendicular to the vertex axis that increases in size with movement along the vertex axis in a direction from the distal end toward the plate contacting end.

In one aspect of the structural assembly, the first surface portion of the tube mating surface defines a first outer edge at an intersection of the first surface portion and an exterior surface of the body. The body defines a first distance between the vertex axis and the first outer edge at the distal end of the body. The body defines a second distance between the vertex axis and the first outer edge at the plate contacting end. The first distance is less than the second distance.

In another aspect of the structural assembly, the second surface portion of the tube mating surface defines a second outer edge at an intersection of the second surface portion and the exterior surface of the body. The body defines a third distance between the vertex axis and the second outer edge at the distal end of the body. The body defines a fourth distance between the vertex axis and the second outer edge at the plate contacting end. The third distance is less than the fourth distance.

In one aspect of the structural assembly, the plate mating surface of the gusset structure forms a partial rounded shape. In one embodiment, the partial rounded shape is a partial elliptical shape. In another embodiment, the partial rounded shape is a partial circular shape.

In another aspect of the structural assembly, the tube mating surface of the gusset structure includes a third surface portion interconnecting the first surface portion and the second surface portion. The third surface portion includes a cross-sectional shape perpendicular to the vertex axis forming an arcuate shape. The arcuate cross-sectional shape of the third surface portion is sized to mate with a rounded corner of the elongate member interconnecting the first side wall and the second side wall of the elongate member.

The above and other features will become apparent from the following description and accompanying drawings.

BRIEF DESCRIPTION OF THE DRAWINGS

The detailed description of the drawings refers to the accompanying figures.

DETAILED DESCRIPTION OF THE DRAWINGS

Those having ordinary skill in the art will recognize that terms such as "above," "below," "upward," "downward," "top," "bottom," etc., are used descriptively for the figures, and do not represent limitations on the scope of the disclosure, as defined by the appended claims.

Figure 1:
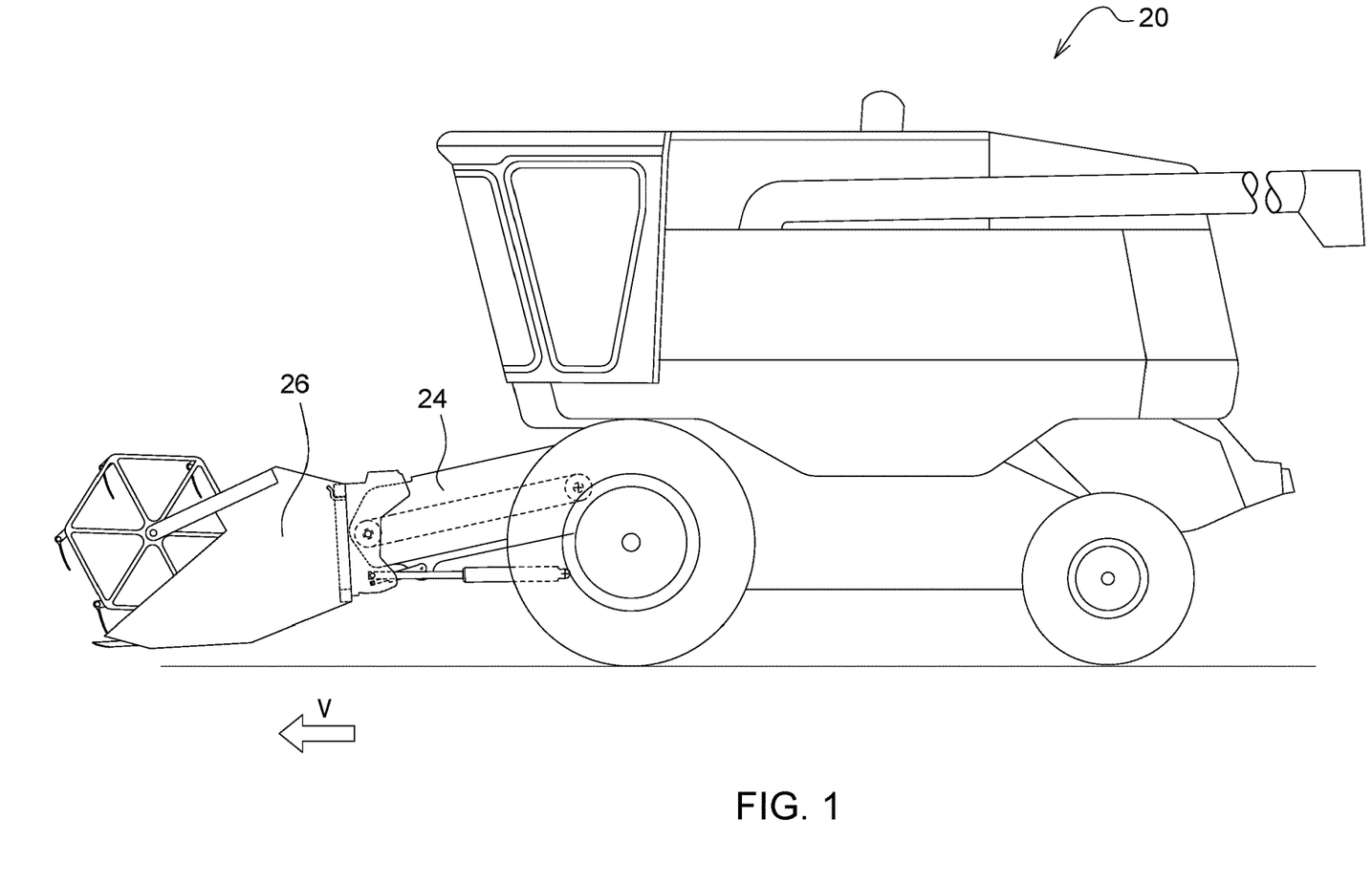
FIG. 1 is a schematic side view of a vehicle.

Referring to the Figures, wherein like numerals indicate corresponding parts throughout the several views, a vehicle is generally shown at 20 in FIG. 1. The vehicle 20 may include any type of moveable platform, such as but not limited to a tractor, combine, trailer, car, truck, train, etc. The vehicle 20 includes a structural assembly 22. While the structural assembly 22 is shown incorporated into the exemplary embodiment of the vehicle 20, it should be appreciated that the structural assembly 22 may be incorporated into some other non-moveable platform, such as but not limited to a building frame or stationary engine platform. As such, while the detailed description describes and shows the structural assembly 22 incorporated into the vehicle 20, it should be appreciated that the structural assembly 22 is not required to be part of the vehicle 20.

Figure 2:
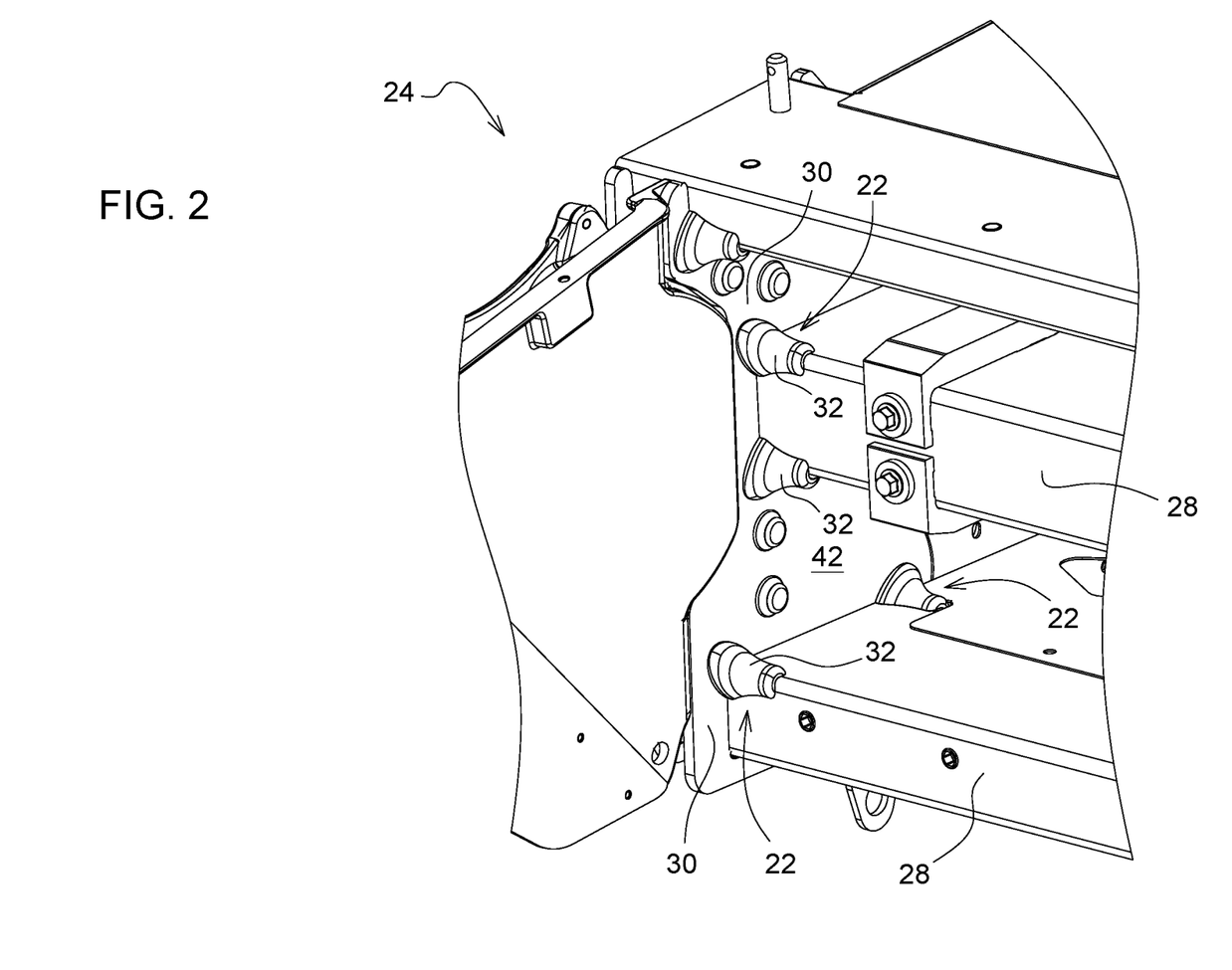
FIG. 2 is a schematic perspective view of a structural assembly of the vehicle showing a plate, an elongate member, and a gusset structure attached together.

Referring to FIG. 1, the exemplary embodiment of the vehicle 20 is shown as a combine. The combine includes a fixed frame 24 supporting a head unit 26. Referring to FIG. 2, the fixed frame 24 is shown including multiple structural assemblies 22. Each structural assembly 22 includes an elongate member 28 attached to a plate 30, with a gusset structure 32 attached to and interconnecting the elongate member 28 and the plate 30. It should be appreciated that the use of the structural assembly 22 in the fixed frame 24 of the vehicle 20 is merely an exemplary application of the gusset structure 32. As such, the specific details of the vehicle 20 and the fixed frame 24 are not pertinent to the teachings of this disclosure, and are therefore not described in detail herein.

In the exemplary embodiment shown in the Figures and described herein, the plate 30, the elongate member 28, and the gusset structure 32 are formed from a metal, and are welded together to form the structural assembly 22. However, in other embodiments, the plate 30, the elongate member 28, and the gusset structure 32 may be formed from some other non-material, such as but not limited to a plastic or nylon material, and may be attached together using some other process suitable for the particular materials and application.

The elongate member 28 may include a solid structure, or a tubular structure defining a hollow center or core. The elongate member 28 extends along a central longitudinal axis 34, and includes multiple side walls that extend parallel with the central longitudinal axis 34. Each of the side walls forms a substantially planar exterior surface. Each adjacent pair of side walls of the elongate member 28 is connected by a respective corner. The corners of the elongate member 28 may be rounded and include an arcuate cross section perpendicular to the central longitudinal axis 34. As such, each of the corners of the elongate member 28 may be referred to herein as a rounded corner.

Figure 5:
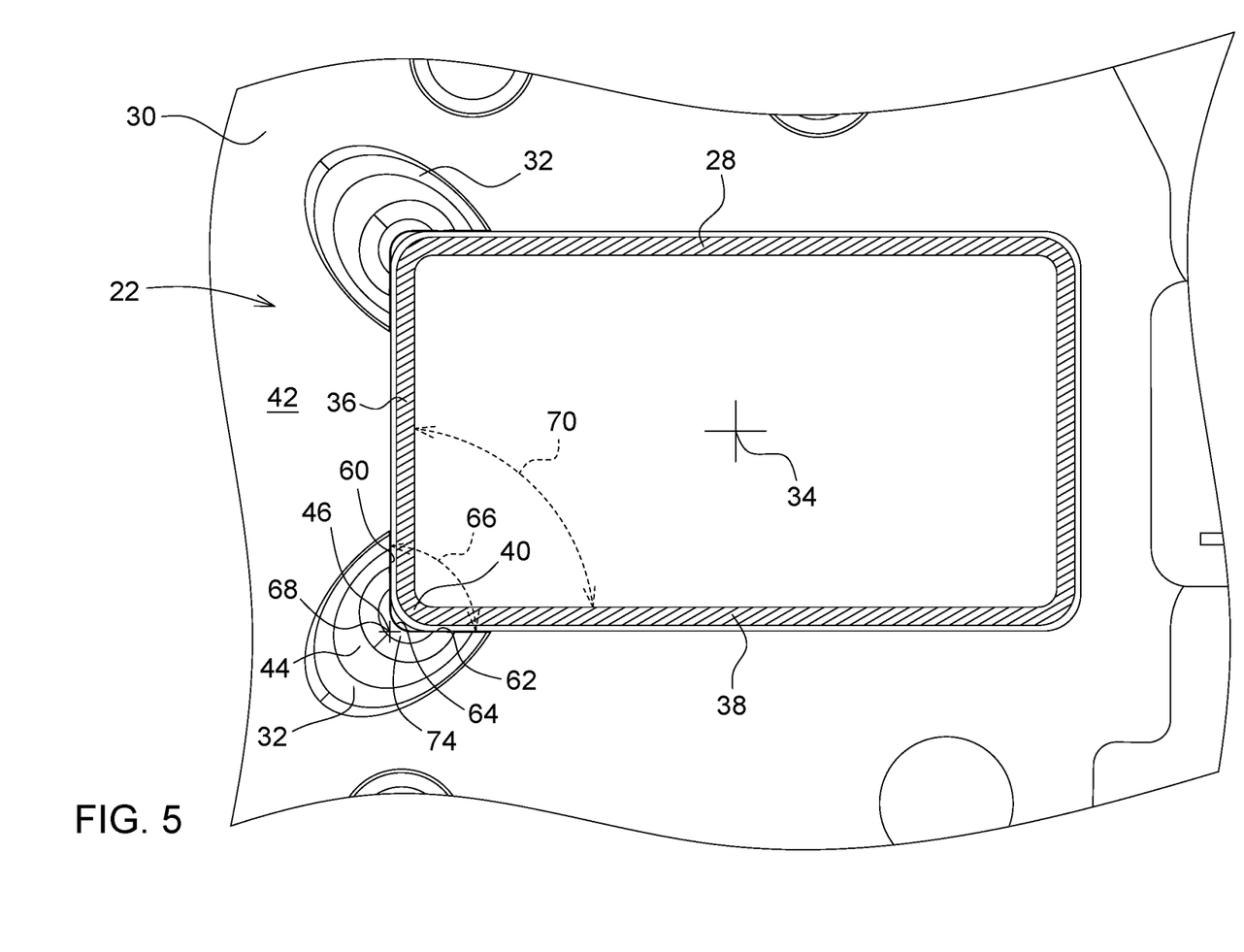
FIG. 5 is a schematic top view of the structural assembly.
Figure 6:
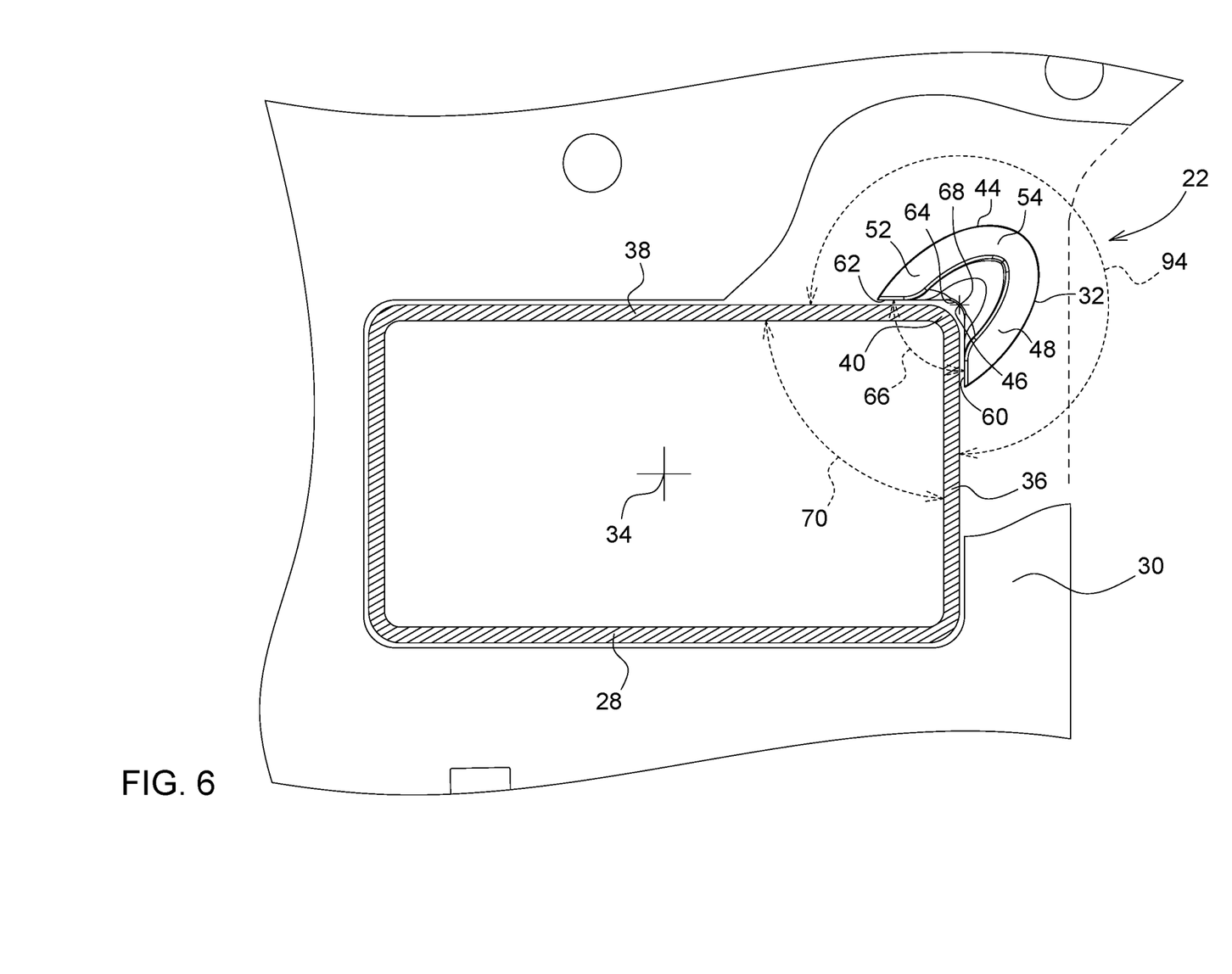
FIG. 6 is a schematic bottom view of the structural assembly.

In the exemplary embodiment shown in the Figures and described herein, and as best shown in FIGS. 5 and 6, the elongate member 28 includes a rectangular cross section perpendicular to the central longitudinal axis 34. As such, the elongate member 28 may be referred to herein as the rectangular member 28. The rectangular member 28 includes four side walls and four respective rounded corners. Each of the corners of the rectangular member 28 form a right angle, i.e., 90°, connecting their respective side walls. However, other embodiments of the elongate member 28 may include a cross sectional shape other than the rectangular shape shown and described herein. As such, other embodiments of the elongate member 28 may include more or less than the exemplary four side walls and four corners shown in the Figures and described herein, with each of the corners defining an angle different than the exemplary right angle shown in the Figures and described herein.

Referring to FIG. 5, the elongate member 28 includes a first side wall 36, a second side wall 38, and a corner 40 disposed between and interconnecting the first side wall 36 and the second side wall 38. While the detailed description describes only the first side wall 36, the second side wall 38, and the corner 40 therebetween, it should be appreciated that the teachings of the disclosure may be applied to the other side walls and their respective corners of the elongate member 28. The first side wall 36 and the second side wall 38 are arranged adjacent to each other, and are positioned to form a substantially right angle therebetween.

Referring to FIG. 2, the plate 30 includes a flat structure having a thickness, and forms a planar exterior surface 42 to which the elongate member 28 is attached. The elongate member 28 is attached to the plate 30 around a circumference or perimeter of the elongate member 28, either at a terminal end of the elongate member 28, or at a midsection where the elongate member 28 passes through the plate 30. The plate 30 is positioned transverse to the central longitudinal axis 34 of the elongate member 28, such that the central longitudinal axis 34 and the elongate member 28 intersect the plate 30. The plate 30 may include any structure forming the planar exterior surface 42 to which the elongate member 28 is attached, such as a flat plate structure, or a larger wall portion of some other structural member, such as but not limited to a tubular structure, a channel structure, an angle structure, an I-beam, etc.

The gusset structure 32 is attached to and interconnects both the plate 30 and the elongate member 28. Due to the cross sectional geometric shape of the elongate member 28, the corner 40 of the elongate member 28 exhibits a high strength and/or rigidity. When the elongate member 28 is attached to the plate 30, the high strength and/or rigidity of the elongate member 28 at the corner 40 may introduce a high stress into the plate 30. The gusset structure 32 distributes the stress in the plate 30, which would otherwise be concentrated at the joint formed between the plate 30 and the elongate member 28 in the corner 40 connecting the first side wall 36 and the second side wall 38, over a larger area, thereby reducing the stress in the plate 30.

Referring to FIGS. 3-7, the gusset structure 32 includes a body 44. The body 44 of the gusset structure 32 may be formed from any suitable process, such as casting, forging, machining, additive manufacturing, etc. In the exemplary embodiment described herein, the gusset structure 32 includes and is formed from a metal. However, in other embodiments, the gusset structure 32 may include and be formed from a non-metal, such as but not limited to a plastic or nylon material.

The body 44 extends along a vertex axis 46 between a plate contacting end 48 and a distal end 50. The plate contacting end 48 forms a plate mating surface 52 for engaging the plate 30. In the exemplary embodiments shown in the Figures and described herein, the elongate member 28 is positioned in a substantially orthogonal position relative to the plate 30. As such, the plate mating surface 52 is substantially perpendicular to the vertex axis 46 in order to position the elongate member 28 in the substantially orthogonal position relative to the plate 30. However, in other embodiments, in which the elongate member 28 may be angled relative to the plate 30 at an angle other than ninety degrees, the vertex axis 46 may likewise be angled relative to the plate 30 at an angle other than ninety degrees. As such, it should be appreciated that the vertex axis 46 may be arranged substantially parallel with the central longitudinal axis 34 of the elongate member 28.

The plate mating surface 52 defines a first area 54 having a perimeter that may form a partial rounded shape. The first area 54 is best shown in FIG. 6. The partial rounded shape may include any curved or rounded shape that does not include vertices that may induce localized stress. For example, the partial rounded shape is shown in the Figures having a shape defining a partial oval or a partial ellipse, in which a semi-major axis is longer than a semi-minor axis. This particular embodiment distributes the stress farther away from the joint while not including any vertices that may induce localized stress points in the plate 30. Other embodiments may include the partial rounded shape defining a partial circular shape, in which a semi-minor axis and a semi-major axis are substantially equal. It should be appreciated that the partial rounded shape may include some other shape not shown in the Figures or described herein.

Figure 3:
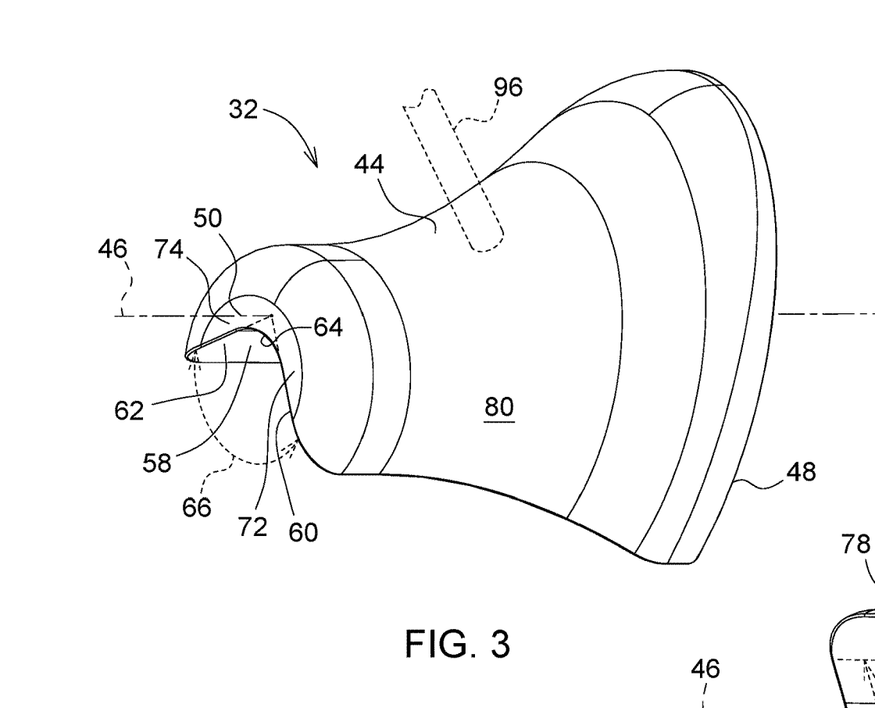
FIG. 3 is a schematic perspective view of the gusset structure from a first perspective.
Figure 4:
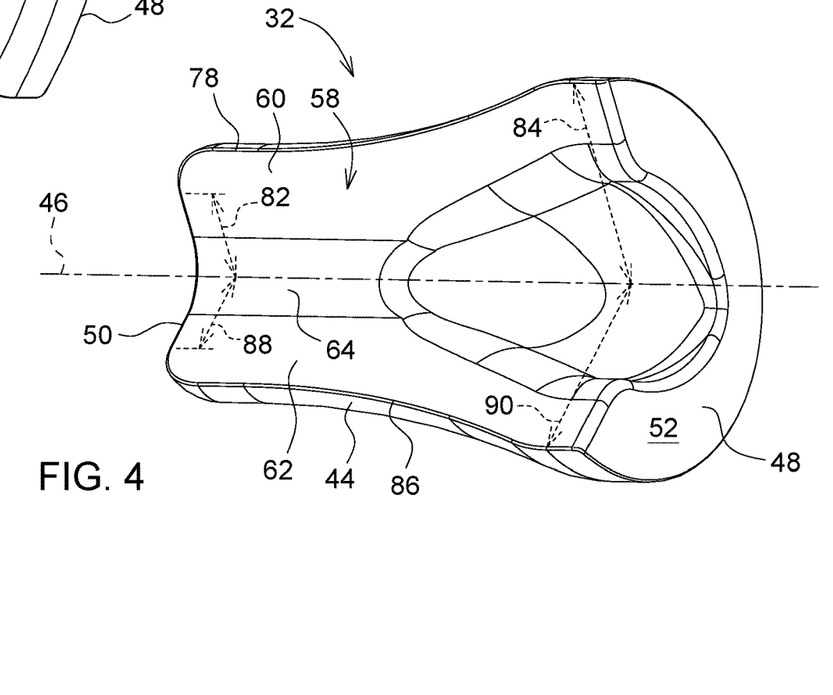
FIG. 4 is a schematic perspective view of the gusset structure from a second perspective.
Figure 7:
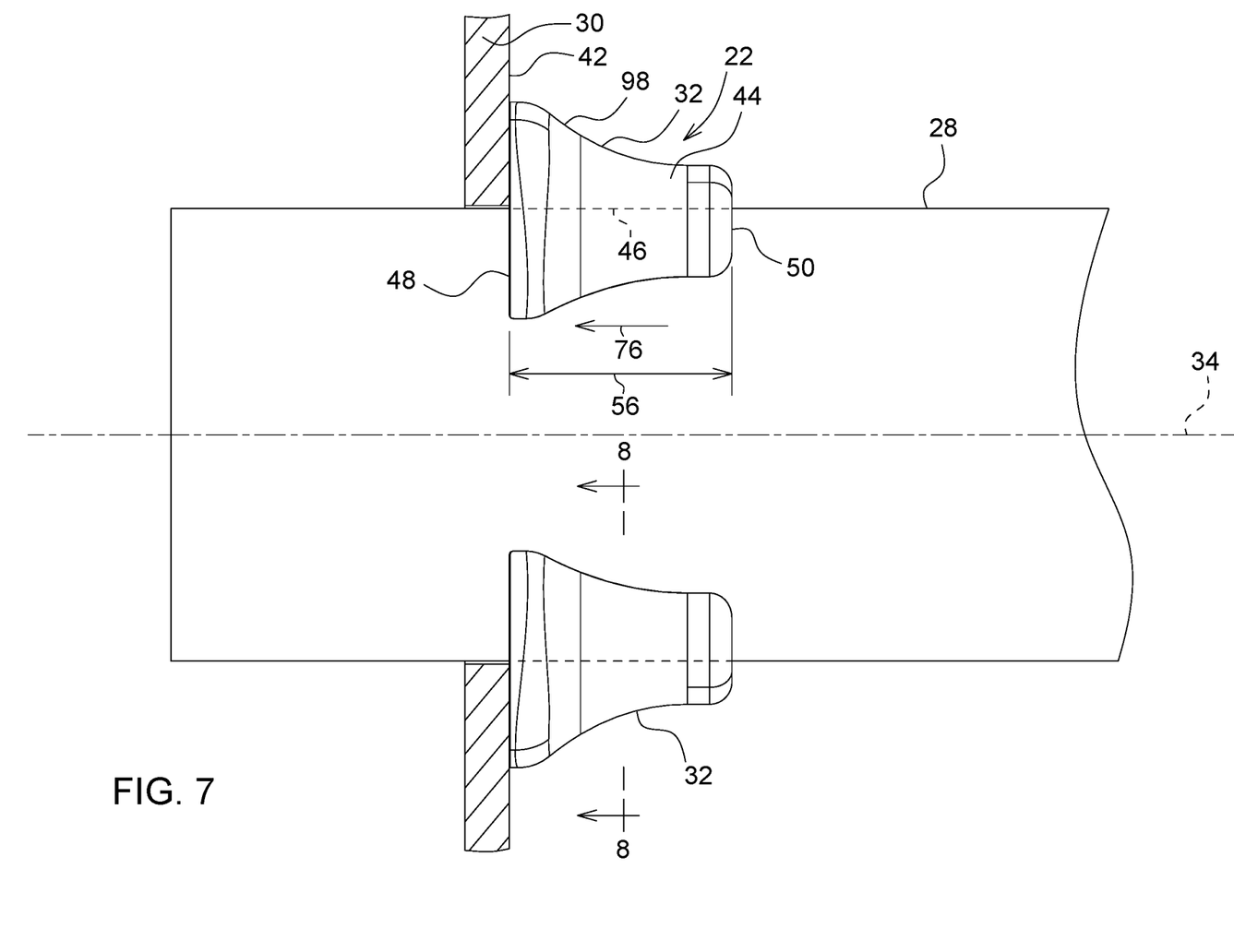
FIG. 7 is a schematic side plan view of the structural assembly.

As shown in FIG. 7, the distal end 50 of the body 44 is spaced from the plate contacting end 48 a length 56 along the vertex axis 46. As best shown in FIGS. 3 and 4, the body 44 further defines a tube mating surface 58, which extends between and interconnects the plate contacting end 48 and the distal end 50 of the body 44. The tube mating surface 58 includes a first surface portion 60, a second surface portion 62, and a third surface portion 64, all of which extend away from the plate contacting end 48 to the distal end 50 of the body 44. The first surface portion 60 and the second surface portion 62 form an interior surface angle 66 therebetween. The interior surface angle 66 has a vertex 68 disposed on the vertex axis 46. The value of the interior surface angle 66 is substantially equal to the value of an interior wall angle 70 formed between the first side wall 36 and the second side wall 38. In the exemplary embodiment shown in the Figures and described herein, the first side wall 36 and the second side wall 38 are positioned to form the interior wall angle 70 therebetween that is substantially equal to ninety degrees. As such, the exemplary embodiment of the gusset structure 32 includes the interior surface angle 66 between the first surface portion 60 and the second surface portion 62 also equal to substantially ninety degrees. It should be appreciated that in other embodiments, in which the first side wall 36 and the second side wall 38 of the elongate member 28 form a non-right angle therebetween having a defined value greater than or less than ninety degrees, the value of the interior angle between the first surface portion 60 and the second surface portion 62 is configured to mate with and match that defined value. As such, it should be appreciated that the interior surface angle 66 may differ from the exemplary right angle shown in the Figures and described herein.

The first surface portion 60 of the tube mating surface 58 is positioned for engaging the first side wall 36 of the elongate member 28, and the second surface portion 62 of the tube mating surface 58 is positioned for engaging the second side wall 38 of the elongate member 28. The third surface portion 64 interconnects the first surface portion 60 and the second surface portion 62. The third surface portion 64 includes a cross-sectional shape, perpendicular to the vertex axis 46, which forms an arcuate shape. The arcuate cross-sectional shape of the third surface portion 64 is sized to mate with the rounded corner 40 of the elongate member 28 interconnecting the first side wall 36 and the second side wall 38.

As described above, the plate mating surface 52 defines the first area 54. The distal end 50 of the body 44 forms an end surface 72 that defines a second area 74. The second area 74 is best shown in FIG. 3. In the exemplary embodiment of the gusset structure 32 shown in the Figures and described herein, the first area 54 of the plate mating surface 52 is larger than the second area 74 of the end surface 72. In other words, the plate contacting end 48 is larger than the distal end 50. The gusset structure 32 is configured to include the larger area of the plate mating surface 52 to spread or distribute internal forces of the plate 30 over a larger area of the plate 30 in order to reduce the internal stress in the plate 30 at the joint formed between the elongate member 28 and the plate 30 at the corner 40 of the elongate member 28.

Figure 8:
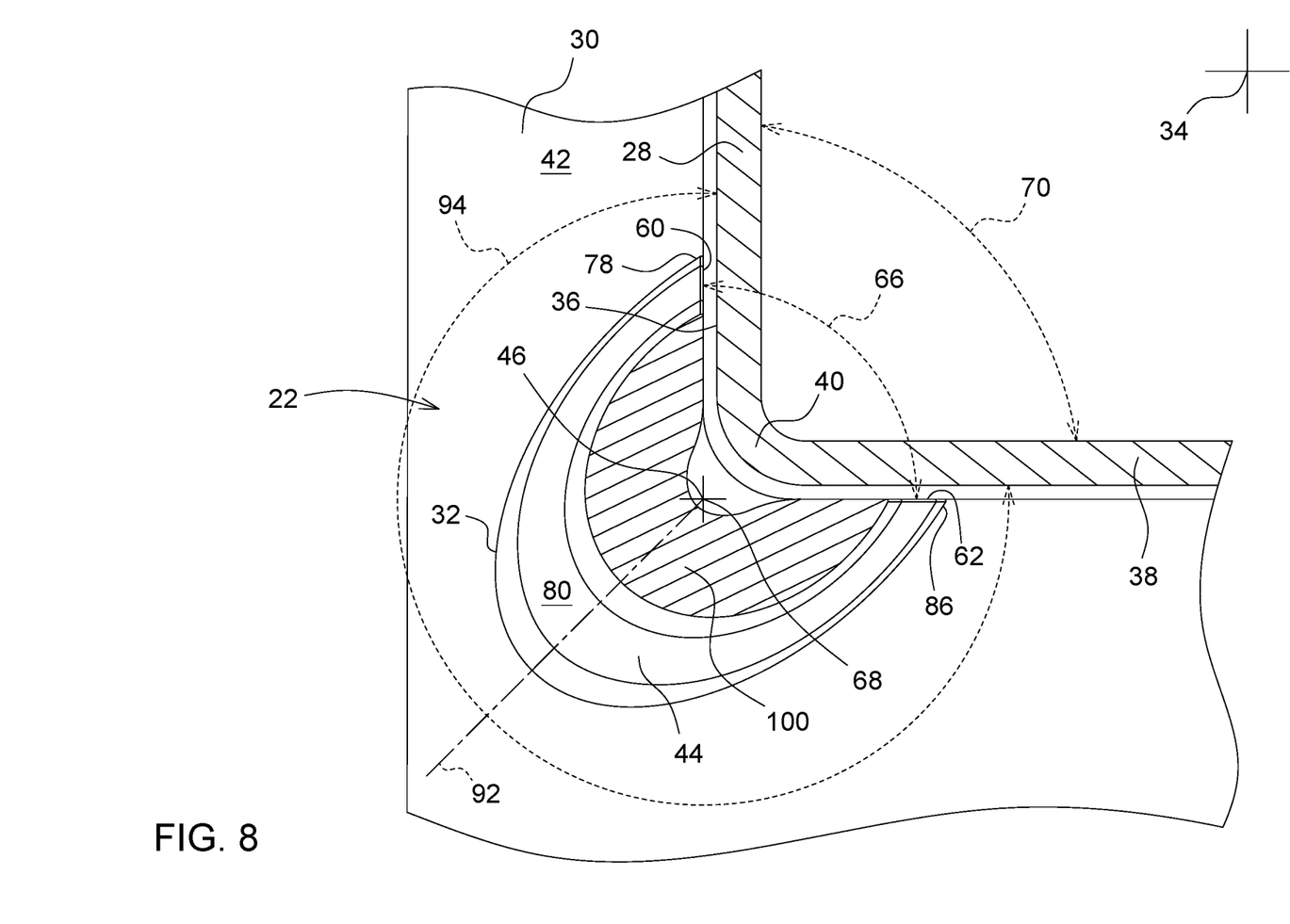
FIG. 8 is a schematic cross-sectional view of the structural assembly.

Referring to FIG. 8, the body 44 of the gusset structure 32 includes or defines a cross-sectional area 100 perpendicular to the vertex axis 46. The cross-sectional area of the body 44 increases in size with movement along the vertex axis 46, in a direction from the distal end 50 toward the plate contacting end 48, indicated by arrow 76 shown in FIG. 7. By doing so, the size of the plate contacting end 48 is increased to provide the larger stress distribution area.

In the exemplary embodiment of the gusset structure 32 shown in the Figures and described herein, the cross-sectional area of the body 44 changes at a variable rate-of-change per unit length 56 along the vertex axis 46. As such, when viewed from the side, as shown in FIG. 7, the gusset structure 32 includes an exterior surface profile 98 connecting the distal end 50 and the plate contacting end 48 that exhibits a generally concave side profile 98. However, in other embodiments, the cross-sectional area of the body 44 may change at a constant or non-variable rate-of-change per unit length 56 along the vertex axis 46, such that when viewed from the side, the gusset structure 32 includes an exterior surface profile connecting the distal end 50 and the plate contacting end 48 that exhibits a generally triangular side profile.

Referring to FIG. 4, the first surface portion 60 of the tube mating surface 58 defines a first outer edge 78 at an intersection of the first surface portion 60 and an exterior surface 80 of the body 44. The body 44 defines a first distance 82 between the vertex axis 46 and the first outer edge 78 at the distal end 50 of the body 44. The body 44 defines a second distance 84 between the vertex axis 46 and the first outer edge 78 at the plate contacting end 48. Because the distal end 50 of the body 44 is smaller than the plate contacting end 48, the first distance 82 is less than the second distance 84.

Referring to FIG. 4, the second surface portion 62 of the tube mating surface 58 defines a second outer edge 86 at an intersection of the second surface portion 62 and the exterior surface 80 of the body 44. The body 44 defines a third distance 88 between the vertex axis 46 and the second outer edge 86 at the distal end 50 of the body 44. The body 44 defines a fourth distance 90 between the vertex axis 46 and the second outer edge 86 at the plate contacting end 48. Because the distal end 50 of the body 44 is smaller than the plate contacting end 48, the third distance 88 is less than the fourth distance 90.

In the exemplary embodiment shown in the Figures and described herein, the first distance 82 and the third distance 88 are substantially equal, and the second distance 84 and the fourth distance 90 are substantially equal. However, in other embodiments, the first distance 82 and the third distance 88 may differ, and the second distance 84 and the fourth distance 90 may differ.

Referring to FIG. 8, the plate contacting end 48 includes a central axis 92 disposed on the plate mating surface 52. The central axis 92 of the plate contacting end 48 extends from the vertex axis 46 radially outward and away from the rounded corner 40 of the elongate member 28, toward the perimeter of the plate mating surface 52. The central axis 92 bisects the plate mating surface 52 to form two substantially equal halves. In the exemplary embodiment shown in the Figures and described herein, the central axis 92 bisects an external wall angle 94 formed between the first side wall 36 and the second side wall 38 of the elongate member 28. As such, in the exemplary embodiment shown in the Figures, in which the elongate member 28 is rectangular forming a right angle between the first side wall 36 and the second side wall 38, the external wall angle 94 is substantially equal to two hundred seventy degrees, and the central axis 92 bisects the external wall angle 94, with a first half of the plate mating surface 52 disposed on a first side of the central axis 92, and a second half of the plate mating surface 52 disposed in a second side of the central axis 92.

The components of the structural assembly 22, i.e., the plate 30, the elongate member 28, and the gusset structure 32, are permanently and fixedly attached together. The components of the structural assembly 22 may be attached together in any suitable manner. For example, the components of the structural assembly 22 may be welded together to form a strong connection therebetween. In other embodiments, other attachment processes, such as but not limited to bonding with an adhesive, may be used to connect the components of the structural assembly 22.

In order to improve assembly efficiency, the body 44 of the gusset assembly may be magnetized so that a magnetic force secures the gusset assembly to the plate 30 and/or the elongate member 28. The magnetic force may hold the gusset assembly in place allowing the final attachment process to be executed. For example, the magnetic force may hold the gusset assembly in place relative to the plate 30 and/or the elongate member 28 while the gusset assembly is welded to the plate 30 and the elongate member 28.

In other embodiments, the gusset structure 32 may be formed to include a removeable handle 96, shown in FIG. 3, that extends outwardly from the body 44. The removable handle may be shaped to provide a convenient hand hold that enables an assembly person or a robotic machine to easily grasp and hold the gusset assembly in place relative to the plate 30 and the elongate member 28 allowing the final attachment process to be executed.

While the above describes example embodiments of the present disclosure, these descriptions should not be viewed in a limiting sense. Rather, other variations and modifications may be made without departing from the scope and spirit of the present disclosure as defined in the appended claims.

What is claimed is:

1. A gusset structure for distributing stress at a joint formed between a plate and an elongate member, the gusset structure comprising:
   a body having a plate contacting end forming a plate mating surface for engaging the plate;
   wherein the body forms a tube mating surface having a first surface portion and a second surface portion forming an interior surface angle therebetween and extending away from the plate contacting end, with the interior surface angle having a vertex disposed on a vertex axis that intersects the plate mating surface;
   wherein the first surface portion of the tube mating surface is positioned for engaging a first side wall of the elongate member, and the second surface portion of the tube mating surface is positioned for engaging a second side wall of the elongate member;
   wherein the body includes a distal end spaced from the plate contacting end a length along the vertex axis, with the tube mating surface extending between and interconnecting the plate contacting end and the distal end of the body; and
   wherein the plate mating surface defines a first area, and the distal end forms an end surface defining a second area, with the first area of the plate mating surface being larger than the second area of the end surface.

2. The gusset structure set forth in claim 1, wherein the body includes a cross-sectional area perpendicular to the vertex axis, wherein the cross-sectional area of the body increases in size with movement along the vertex axis in a direction from the distal end toward the plate contacting end.

3. The gusset structure set forth in claim 2, wherein the cross-sectional area of the body changes at a variable rate-of-change per unit length along the vertex axis.

4. The gusset structure set forth in claim 1, wherein the first surface portion of the tube mating surface defines a first outer edge at an intersection of the first surface portion and an exterior surface of the body, and wherein the second surface portion of the tube mating surface defines a second outer edge at an intersection of the second surface portion and the exterior surface of the body.

5. The gusset structure set forth in claim 1, wherein the plate mating surface forms a partial rounded shape.

6. The gusset structure set forth in claim 1, wherein the tube mating surface includes a third surface portion interconnecting the first surface portion and the second surface portion.

7. The gusset structure set forth in claim 6, wherein the third surface portion includes a cross-sectional shape perpendicular to the vertex axis forming an arcuate shape and sized to mate with a rounded corner of the elongate member interconnecting the first side wall and the second side wall of the elongate member.

8. The gusset structure set forth in claim 1, wherein the plate mating surface is substantially perpendicular to the vertex axis.

9. The gusset structure set forth in claim 1, wherein the body is magnetized.

10. The gusset structure set forth in claim 1, further comprising a removeable handle extending outwardly from the body.

11. A gusset structure for distributing stress at a joint formed between a plate and an elongate member, the gusset structure comprising:
   a body having a plate contacting end forming a plate mating surface for engaging the plate;
   wherein the body forms a tube mating surface having a first surface portion and a second surface portion forming an interior surface angle therebetween and extending away from the plate contacting end, with the interior surface angle having a vertex disposed on a vertex axis that intersects the plate mating surface;
   wherein the first surface portion of the tube mating surface is positioned for engaging a first side wall of the elongate member, and the second surface portion of the tube mating surface is positioned for engaging a second side wall of the elongate member;
   wherein the first surface portion of the tube mating surface defines a first outer edge at an intersection of the first surface portion and an exterior surface of the body, and wherein the second surface portion of the tube mating surface defines a second outer edge at an intersection of the second surface portion and the exterior surface of the body; and
   a first distance between the vertex axis and the first outer edge at the distal end of the body, and a second distance between the vertex axis and the first outer edge at the plate contacting end, with the first distance being less than the second distance.

12. The gusset structure set forth in claim 11, further comprising a third distance between the vertex axis and the second outer edge at the distal end of the body, and a fourth distance between the vertex axis and the second outer edge at the plate contacting end, with the third distance being less than the fourth distance.

13. The gusset structure set forth in claim 12, wherein the first distance and the third distance are substantially equal, and wherein the second distance and the fourth distance are substantially equal.

14. A structural assembly comprising:
   a plate;
   an elongate member attached to the plate;
   wherein the elongate member extends along a central longitudinal axis and includes a first side wall and a second side wall arranged adjacent to each other and positioned to form an interior wall angle therebetween;
   wherein the plate is positioned transverse to the central longitudinal axis of the elongate member; and
   a gusset structure attached to both the plate and the elongate member, the gusset structure including:
      a body having a plate contacting end forming a plate mating surface in abutting engagement with the plate;
      wherein the body forms a tube mating surface having a first surface portion and a second surface portion forming an interior surface angle therebetween and extending away from the plate contacting end, with the interior surface angle having a vertex disposed on a vertex axis that intersects the plate mating surface, and with the interior surface angle substantially equal to the interior wall angle;
      wherein the first surface portion of the tube mating surface is disposed against the first side wall of the elongate member, and the second surface portion of the tube mating surface is disposed against the second side wall of the elongate member;
      wherein the body includes a distal end spaced from the plate contacting end a length along the vertex axis, with the tube mating surface extending between and interconnecting the plate contacting end and the distal end of the body; and wherein the plate mating surface defines a first area, and the distal end forms an end surface defining a second area, with the first area of the plate mating surface being larger than the second area of the end surface.

15. The structural assembly set forth in claim 14, wherein the body includes a cross-sectional area perpendicular to the vertex axis, wherein the cross-sectional area of the body increases in size with movement along the vertex axis in a direction from the distal end toward the plate contacting end.

16. The structural assembly set forth in claim 14, wherein:

the first surface portion of the tube mating surface defines a first outer edge at an intersection of the first surface portion and an exterior surface of the body;

the body defines a first distance between the vertex axis and the first outer edge at the distal end of the body;

the body defines a second distance between the vertex axis and the first outer edge at the plate contacting end;

the first distance is less than the second distance;

the second surface portion of the tube mating surface defines a second outer edge at an intersection of the second surface portion and the exterior surface of the body;

the body defines a third distance between the vertex axis and the second outer edge at the distal end of the body;

the body defines a fourth distance between the vertex axis and the second outer edge at the plate contacting end; and the third distance is less than the fourth distance.

17. The structural assembly set forth in claim 14, wherein the plate mating surface forms a partial elliptical shape.

18. The structural assembly set forth in claim 14, wherein the tube mating surface includes a third surface portion interconnecting the first surface portion and the second surface portion, and wherein the third surface portion includes a cross-sectional shape perpendicular to the vertex axis forming an arcuate shape and sized to mate with a rounded corner of the elongate member interconnecting the first side wall and the second side wall of the elongate member.

* * * * *